United States Patent [19]

Bennett et al.

[11] 4,451,550
[45] May 29, 1984

[54] VESICULAR FILM AND COMPOSITION WITH PHENOXY RESIN MATRIX

[75] Inventors: Everett W. Bennett, Longmeadow; Ahmad Arfaei, Holyoke, both of Mass.

[73] Assignee: James River Graphics, Inc., South Hadley, Mass.

[21] Appl. No.: 403,108

[22] Filed: Jul. 29, 1982

[51] Int. Cl.³ .......................... G03C 1/52; G03C 1/60; G03C 1/72
[52] U.S. Cl. ..................................... 430/176; 430/152; 430/177; 430/191; 430/192; 430/195; 430/196; 430/270; 430/280; 430/290
[58] Field of Search ............... 430/152, 176, 177, 191, 430/192, 195, 196, 270, 280, 290

[56] References Cited

U.S. PATENT DOCUMENTS

| | | | |
|---|---|---|---|
| 3,387,976 | 6/1968 | Sorkin | 430/286 |
| 3,622,333 | 11/1971 | Cope | 430/152 |
| 3,652,272 | 3/1972 | Thomas | 430/176 |
| 3,779,768 | 12/1973 | Cope et al. | 430/152 |
| 3,779,774 | 12/1973 | Cope et al. | 430/152 |
| 4,272,603 | 6/1981 | Chenevert | 430/152 |
| 4,289,838 | 9/1981 | Rowe et al. | 430/176 |
| 4,302,524 | 11/1981 | Mandella et al. | 430/152 |
| 4,337,307 | 6/1982 | Newbauer | 430/176 |

FOREIGN PATENT DOCUMENTS

| | | | |
|---|---|---|---|
| 975456 | 11/1964 | United Kingdom | 430/152 |
| 975457 | 11/1964 | United Kingdom | 430/152 |

*Primary Examiner*—Charles L. Bowers, Jr.
*Attorney, Agent, or Firm*—Burns, Doane, Swecker & Mathis

[57] ABSTRACT

Novel, coatable, highly long-chain branched, ungelled, most preferably endblocked, non-linear phenoxy resins of random structure devoid of regularly recurring units, with the average distance between the branch sites thereof being essentially of the same order of magnitude as the average branch length, such resins advantageously comprising the copolymerization product of:

(i) at least one dihydric phenol, e.g., sulfonyl diphenol;
(ii) an epoxy comonomer having two epoxy functional groups, e.g., resorcinol diglycidyl ether;
(iii) a branching agent comprising an epoxy or phenolic compound having a functionality greater than 2, and preferably at least 3, wherein the amount of branching agent is sufficient to provide at least 10 mole percent branch sites in the polymer resin, and, most preferably;
(iv) a monofunctional phenol or epoxide as an endblocker compound.

The branched phenoxy resins are well adapted as matrices for enhanced film speed vesicular films.

33 Claims, No Drawings

VESICULAR FILM AND COMPOSITION WITH PHENOXY RESIN MATRIX

BACKGROUND OF THE INVENTION

1. Field of the Invention

The present invention relates to novel, coatable, highly long-chain branched, ungelled, most preferably end blocked, non-linear, phenoxy resins of random structure devoid of regularly recurring units, which have an average distance between the branch sites thereof essentially of the same order of magnitude as the average branch length. The present invention also relates to vesicular films, and more particularly, to vesicular compositions useful therefor comprising such non-linear, highly long-chain branched, and most preferably endblocked, phenoxy resins as a vehicle or matrix for a vesiculating agent.

2. Description of the Prior Art

Vesicular images are formed in a photographic film by refraction of light from small bubbles or vesicles of gas which are formed and trapped in those areas of the film exposed to light and thereafter developed. The film generally has a resinous coating which carries a light-sensitive vesiculating agent, which coating is deposited on a photographic grade film or substrate. The light-sensitive vesiculating agent is generally referred to as a sensitizer, with the most commonly employed sensitizers being diazo-compounds which, upon exposure to light, generate nitrogen gas. The gas does not form vesicles immediately but does so upon thermal development of the film, thereby allowing the microdispersed gaseous material to coalesce and form the bubbles. The resulting vesicles or bubbles in the exposed area make the matrix opaque to the transmission of light in such areas.

Successful vesicular imaging, irregardless of the gas used to develop the bubbles in the matrix polymer, e.g., oxygen, isobutylene, carbon dioxide or nitrogen, has a fundamental physical requirement relating the critical minimum bubble radius to the gas pressure available to supply the work needed to expand the vesicle from the incipient vesicle site or nucleation center. The gas pressure available from the imagewise photolysis of the gas progenitor and the vesicle formation dynamics depend upon a complex interplay between the polymer matrix characteristics, i.e., gas solubility in the matrix, nucleation sites, matrix flow properties and gas barrier properties. Thus, the matrix or vehicle in which the sensitizer or vesiculating agent is dispersed and within which the vesicles are formed upon exposure and development, is one of the essential components influencing the performance of a vesicular film. It is generally accepted that the barrier properties dominate the choice of optimum vesicular imaging matrix polymers since in the absence of good gas barrier properties none of the other requirements, either alone or in combination, is sufficient to afford a useful vesicular imaging film.

Over the past two decades, commercial interest in the advantages of the "dry" development process employed with vesicular films has led to intense research in this area of technology with the result that the relatively few classes of polymers with adequate gas barrier properties have been identified; e.g., Saran ®, poly(alpha-chloroacrylonitrile), polymethacrylonitrile and various co- and terpolymers of the latter two monomers. The search for new polymers exhibiting superior vesiculating characteristics is, however, continuously ongoing.

The excellent barrier properties of certain linear, i.e., unbranched and uncrosslinked, phenoxy resins toward gases and moisture vapor are well documented, e.g., see *New Linear Polymers* by Lee et al, pages 52 and 53 (1967), thereby making them excellent candidates as vehicles for vesicular film. Indeed, such linear phenoxy resins are disclosed as being useful as matrix resins for relatively low speed diazo vesicular imaging film in U.S. Pat. No. 3,622,333. It can be exceedingly difficult, however, to economically achieve a sufficient degree of polymerization of such linear resins to thereby provide a highly viscous coating solution, and in particular, a coating solution having a viscosity sufficiently great to be coatable via precision coating techniques.

The use of novolac branched phenoxy resins as a matrix resin is also known. U.S. Pat. No. 4,302,524 discloses a light-sensitive vesicular imaging composition comprising a novolac branched epoxy resin of a bis-glycidyl ether and a dihydric phenol. Problems with gelation during polymerization can, however, render such branched polymer structures very difficult and expensive to synthesize. Such branched polymer structures are best achieved by grafting, but this results in comparatively poor control over polymer structure and concurrent homopolymer formation. A means of readily, and more importantly reproducibly, controlling the branch chain length and molecular weight of branched phenoxy resins, and hence minimizing microgelation and precluding gelation thereof during the polymerization, is a desideratum of the art.

Accordingly, it is an object of the present invention to provide a resin which can be readily, economically and reproducibly polymerized to a highly viscous state, if desired, without gelling, and which resin also exhibits and imparts excellent properties for use as a vehicle in vesicular film.

It is still another object of the present invention to provide novel non-linear or branched phenoxy resins which find great applicability as a matrix resin for vesicular film, and in particular an enhanced speed diazo vesicular imaging film.

It is another object of the present invention to provide a process for easily preparing a non-linear, i.e., highly (at least 10 percent) branched phenoxy resin, without problems with gelation.

Yet another object of the present invention is to provide a novel vesicular film comprising a highly long-chain branched phenoxy resin.

These and other objects, as well as the scope, nature and utilization of the invention, will be apparent to those skilled in the art from the following description and the appended claims.

SUMMARY OF THE INVENTION

In accordance with the aforegoing objectives, the present invention provides a coatable, highly long-chain branched, ungelled, non-linear phenoxy resin of random structure which is devoid of regularly recurring units and which has an average distance between the branch sites of essentially the same order of magnitude as the average branch length. Such resins are most preferably endblocked, and advantageously comprise the reaction product of (i) at least one dihydric phenol, (ii) an epoxy comonomer having two epoxy functional groups, (iii) a branching agent comprising an epoxy or phenolic compound having a functionality greater than 2, and preferably at least 3, wherein the amount of branching agent employed is sufficient to provide at least 10, and preferably at least 15 to 20, mole percent branch sites in the polymer resin; and, most preferably;

(iv) a monofunctional phenol or epoxide as an endblocker compound. The amount of endblocker compound employed is generally that amount sufficient to preclude gelation of the phenoxy resin during the polymerization reaction and to concurrently determine the average molecular weight.

As used herein, the "functionality" of a compound refers to the average number of epoxy or hydroxy functional groups of that particular compound. Hence, for example, a monofunctional phenol or epoxide for the purposes of the present invention refers to a compound having a single epoxy or hydroxy functional group, irrespective of the presence of other inert functional groups. Indeed, the presence of other functional groups inert in the copolymerization reaction is contemplated within the scope of the present invention, e.g., as in 2,4,6-trichlorophenol which is useful as a monofunctional phenolic endblocker compound.

In a preferred embodiment of the present invention, the branching agent employed is a trifunctional compound, and most preferably, triglycidyl p-aminophenol.

The non-linear, highly branched phenoxy resins provided by the present invention can readily achieve a highly viscous nature. The highly branched phenoxy resins also are extremely chemically and thermally stable, and can exhibit and/or impart excellent properties of thermal stability, enhanced film speed and integrity of chemical structure when employed as a vehicle for a vesicular film.

Thus, in another embodiment of the present invention, there is provided a vesicular film which comprises a support and a vehicle coated thereon containing a dispersed sensitizer, e.g., a diazo compound, capable of generating gas vesicles upon exposure to radiation and subsequent heat actuated development, with said vehicle comprising the highly long-chain branched phenoxy resins of the present invention.

DESCRIPTION OF THE PREFERRED EMBODIMENTS OF THE PRESENT INVENTION

The dihydric phenol employed in the preparation of the non-linear phenoxy resins of the present invention can generally be selected from dihydroxy benzenes and compounds of the formula:

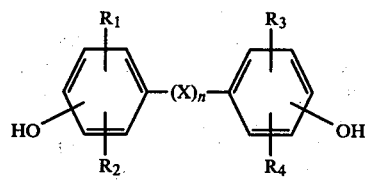

wherein $R_1$, $R_2$, $R_3$, $R_4$ are hydrogen, halogen or lower alkyl; n is an integer from 0-1, and when n is 1, X is —CH$_2$—; —C(CH$_3$)$_2$—; —CH(CH$_3$)—;

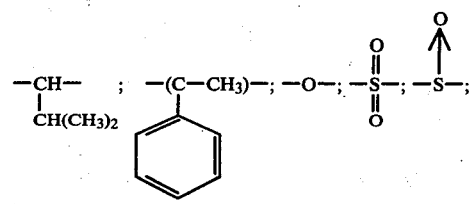

or —S—.

Mixtures of dihydric phenols can also be used and are contemplated within the scope of the present invention.

Examples of suitable dihydric phenols include, but are not limited to, sulfonyl diphenol, bisphenol-A, bisphenol-F and resorcinol. Mixtures of such dihydric phenols may also be suitably employed.

Sulfonyl diphenol is the most preferred dihydric phenol reactant and preferably comprises at least 50 mole percent of the dihydric phenol reactant. An exemplary mixture which can be employed includes a 50/50 molar mixture of sulfonyl diphenol and resorcinol.

The dihydric phenols are reacted with an epoxy comonomer having two epoxy functional groups. Examples of suitable diepoxides include the diglycidyl ether of resorcinol, the diglycidyl ether of bisphenol-A, the diglycidyl ether of hydroquinone, the diglycidyl ether of sulfonyl diphenol, etc. and mixtures thereof. Resorcinol diglycidyl ether is the most preferred diepoxide, but mixtures containing for example 25 mole percent of the diglycidyl ether of bisphenol-A can be used.

Those skilled in the art will realize that due to the nature of the commercial synthesis used some of the epoxy reactants can contain synthesis by-products whose functionality may differ from the principal ingredient and hence must be recognized and accommodated in recipe calculations. An example would be commercial resorcinol diglycidyl ether which usually contains a bis-like structure of molecular weight 388.4 that is difunctional and normally present at circa 7 wt. percent, as well as monofunctional glycidyl ether of molecular weight 240.3 that is normally present at circa 2-4 wt. percent. Analysis of a starting material by chromatography would allow for adjustment of recipe calculations to accommodate the presence of these byproducts. This is also especially true for a monofunctional epoxy endblocking structure when same is employed.

In general, any of the conventionally known dihydric phenols and epoxy compounds useful in preparing phenoxy resins may be employed in the event that a polymer having suitable properties for use as a vehicle in a vesicular film is obtained. The dihydric phenol and epoxy reactants which are most useful are those which provide a polymer having a glass transition temperature above room temperature and preferably in the region used for development in commercial vesicular processers, i.e., around 100° to 160° C. Examples of dihydric phenol/diepoxide polymers affording such glass transition temperatures are tabulated in New Linear Polymers by Henry Lee, Donald Stoffey, and Chris Neville, published by McGraw Hill, 1967, pages 45 and 46 thereof. Those polymers obtained via the reaction of a dihydric phenol and an epoxy compound which have the better gas barrier properties, of course, are preferable for a vesicular film.

The relative amounts of dihydric phenol and diepoxide employed in preparing the branched phenoxy resins can vary. Generally, however, the molar ratio of dihydric phenol to diepoxide comonomer is preferably in the range of from about 0.4 to about 2.4, and most preferably in the range of from about 0.6 to about 1.6. It is also generally preferred that the sum of the equivalents of phenolic comonomer reactants, including any phenolic branching agent and endblocker reactant, be approximately equal to the sum of the equivalents of all epoxy comonomer reactants, inclusive of any epoxy branching agent and endblocker. This, of course, can also vary.

The non-linearity and highly branched structure of the phenoxy resins of the present invention arises from the incorporation into the polymer of the branching agent, which comprises an epoxy or phenolic compound having a functionality greater than two, and preferably in the range of from about 2.2 to about 4, and most preferably of a functionality of about 3. The branching agent can be added upon initiation of the polymerization between the dihydric phenol and epoxy compound so that the branches and cross-linkages are built in from the onset of the polymerization, or the branching agent can be added subsequent to initiation of the polymerization. A mixture of branching agents can be employed if desired.

The amount of epoxy or phenolic branching agent employed is generally that amount sufficient to provide at least 10 mole percent branch sites in the polymer resin, thereby insuring that the phenoxy resin is not a linear resin but a highly branched resin, and most preferably in an amount sufficient to provide from about 15 to 20 mole percent branched sites in the polymer resin.

The percentage of branch sites for the purposes of the present invention is defined as that amount of difunctional reactant of a given chemical genus, i.e., either epoxide or phenol, replaced by branching molecules, i.e., branching agent, in the polymer chain.

Examples of suitable hydroxy branching agents include phloroglucinol, which being trihydroxylic is trifunctional insofar as the polymerization is concerned. Other suitable hydroxy branching agents include 1,3,8-trihydroxynaphthalene; 2,4,4'-trihydroxydiphenyl; 2,4,4'-trihydroxydiphenylether; 2,4,4'-trihydroxydiphenylmethane; and, diresorcyl sulfide.

Preferred epoxy branching agents include the multifunctional glycidyl ethers such as tetrafunctional glycidyl ethers. Epoxy novolac resins may also be employed, such as those having an average functionality of about 3.6, e.g., an epoxy Novolac available from Dow Chemical Co. under the designation DEN-438.

The most preferred epoxy branching agents, however, and indeed the most preferred branching agent employable in accordance with the present invention, are the trifunctional epoxides. A specific example of such trifunctional epoxides which has been found to be most suitable for the purposes of the present invention is triglycidyl p-aminophenol for it has been discovered that though resins of branched structure can indeed be made using either a Novolac resin or a polyglycidyl ether of a Novolac resin as the branching agent in the presence of either a monofunctional glycidyl ether or phenol as endblocker, resins made via an equivalent amount of a trifunctional branching structure, especially an N-glycidyl branching agent such as triglycidyl p-aminophenol, have better rheological properties and are far less prone to develop undesired microgel particles than recipes employing the Novolac materials which contain tetra and pentafunctional components as part of the unavoidable distribution of functionalities in the Novolac. Substitution, for example, of a Novolac glycidyl ether branching agent for a triglycidyl ether of p-aminophenol branching agent in an endblocked resin recipe in accordance with the present invention generally results in the formation of undesired microgel particles.

The dihydric phenol, epoxy compound and branching agent are most preferably reacted conjointly in the presence of an endblocker compound, which is a monofunctional phenol or epoxide. In general, any monofunctional phenol or epoxide can be employed, with those being non-volatile, available in high purity and readily available being most preferred for practical reasons.

The use of an endblocker in accordance with the present invention is most preferred in that it allows the reaction to be run essentially to completion without fear of gelation, and further allows one to skew the molecular weight distribution in a controlled, reproducible and useful manner. The procedures of partial catalyst neutralization and solvent dilution, e.g., as taught in the U.S. Pat. No. 4,302,524, are simply measures to cope with the very rapid increase in viscosity of a non-endblocked recipe as the gel point is approached. Such methods not only prolong the reaction time but also decrease the kettle yield, both undesirable consequences. The use of an endblocker in accordance with the present invention, however, allows one to avoid such undesirable consequences.

It is preferred that the endblocker compound, when a phenol, have a pKa within about 1 of the dihydric phenol employed as a co-reactant, for a correspondence in reaction rate and greater control over both gelation and molecular weight distribution can accordingly be realized. When a mixture of dihydric phenols are used, the endblocker effect depends on which pka of the various dihydric phenols is approximated. The phenolic endblocker compound need only have a pka within about 1 of any of the dihydric phenols in the mixture comprising the dihydric phenol reactant.

For example, when reacting sulfonyl diphenol with an epoxy compound and a branching agent in the presence of resorcinol or bisphenol A as s second dihydric phenol, it is preferred to employ 4-t-butylphenol as an endblocker due to its similarity in pKa to that exhibited by resorcinol or bisphenol A, e.g., in a 50/50 mixture of sulfonyl diphenol and resorcinol. In such a case, it has been found that the reaction surprisingly occurs at a very fast rate and yet control over the gelation is exceedingly effective.

Glycidyl ethers may also be readily employed as endblockers in the present invention and their use is devoid of any considerations of pka. Accordingly, all epoxy endblockers work equally well no matter what the initial reactants are. Examples of suitable epoxy endblockers include glycidyl ethers such as n-butylglycidylether, 4-t-butylphenol glycidyl ether, phenylglycidyl ether, and glycidyl methacrylate.

Obviously mixtures of both types of endblockers, i.e., phenol and epoxy endblockers, can be employed and are also contemplated.

As in the case with a hydroxy endblocker such as 4-t-butylphenol, if a sufficient amount of epoxy endblocker is employed, gelation of the phenoxy resin is precluded. Thus, one has the ability of controlling and reproducing the degree of polymerization of the phenoxy resin and the final solution viscosity without fear of gelation upon using the appropriate amount of endblocker, as gelation is precluded.

The amount of endblocker employed is generally that amount sufficient to preclude gelation of the phenoxy resin during the polymerization reaction and to concurrently determine the average molecular weight. Preferably, the amount of endblocker employed is at least 5 mole percent of the difunctional reactant of the same chemical genus, i.e., either epoxy or phenolic, which is replaced by the monofunctional endblocker comonomer in the polymer. The amount of monofunctional endblocker employed is more preferably in the range of from about 5 to 20 mole percent, and most preferably in the range of from about 5 to 12 mole percent.

The specific choice of endblocker is important since its relative reaction rate (as compared to the difunctional and branching functionalities) determines how fast it is incorporated into the polymer chain segments, and hence, ultimately controls the molecular weight distribution. While glycidyl ethers are all of like reactivity towards phenolic components, there is more ability to manipulate polymer molecular weight distribution when phenolic endblockers of varying pka and hence varying relative reactivity are employed. For example, by employing a monoglycidyl ether such as phenylglycidyl ether (in conjunction with, e.g., a polyglycidyl ether branching agent) whose chemical reactivity towards the phenolic reactants is equal to all other glycidyl ether reactants, an equal specific rate of competitive reaction is obtained and a specific molecular weight distribution results. If, on the other hand, a monofunctional phenolic endblocker is used such as 4-t-butyl phenol or 2,4,6-trichlorophenol, then the molecular weight distribution will be skewed depending upon the pka of the monofunctional phenol which governs its specific rate of reaction relative to the other phenols in the recipe. It should be noted, too, that use of a glycidyl ether branching agent also affords a more even branch distribution since mono-, di- and triglycidyl ethers are all equally reactive whereas the same is not true of phenolic branching agents such as Novolacs vs. e.g., sulfonyl diphenol.

This type of distribution manipulation, e.g., use of varying endblocker levels in conjunction with varying the identity of the endblocker, as well as its point of addition during the synthesis, provides an advantageous control parameter in the preparation of the branched resin system of the present invention that is heretofore unrecognized in the art.

Furthermore, it should be noted that since the different relative reaction rates of these various endblockers allows one to skew the molecular weight distribution at a given number average molecular weight, there is a second important advantage available in using an endblocker via this invention, namely, tailoring the rheological properties of the resin solution to specific coating application techniques. In particular, high viscosity/low solids phenoxy resin solutions can be prepared which have rheological properties ideally suited for some high precision coating methods generally considered superior to the roll coating techniques necessarily used with low viscosity polymers, e.g., the linear polymers characteristic of U.S. Pat. No. 3,622,333.

The use of an endblocker in accordance with the claimed invention thereby allows for control over gelation while further allowing for control over and reproducability of a particular molecular weight range and distribution so that, in effect, the resulting branched phenoxy resin is tailor made for the purpose at hand. These objectives are all accomplished readily and in a facile manner since once the appropriate endblocker level is chosen, the ensuing reaction can be allowed to go to completion without fear of gelation, unlike the process of U.S. Pat. No. 4,302,524.

Though in theory any phenolic endblocker will have utility in actual practice, it is found that due to the rapid branching occurring during polymerization of recipes having levels of 15 to 20 mole percent branching agent, it is preferable to use monophenols whose conjugate bases react fast enough to be competitive without resorting to excessive initial concentrations. In this regard, it has been found that alkylphenols like para-t-butylphenol or mesitol work best when at least part (preferably up to 50 mole percent) of the difunctional phenol is of comparable pka like bisphenol-A or resorcinol. With recipes using only a difunctional phenol of high acidity like sulfonyl diphenol, the alkyl phenols have a different effect from the more acidic monophenols such as p-chlorophenol, 2,4-dichlorophenol or 2,4,5 and 2,4,6-trichlorophenol. Obviously, mixtures of the two types of phenolic endblockers can also be employed or, as previously noted, both epoxy and phenolic endblockers can be used simultaneously.

In general, the phenol-epoxide interpolymerization in preparing the non-linear, highly branched phenoxy resin of the present invention is best accomplished under alkaline catalysis. Examples using, for example, aqueous sodium hydroxide can be found in U.S. Pat. Nos. 3,622,333 and 4,302,524. However, the use of sodium hydroxide as the polymerization catalyst can give rise to several distinct disadvantages, e.g., (1) the inorganic salts remaining after catalyst neutralization are insoluble in the dry resin film and cause optical defects due to crystal formation; (2) the water present can open epoxide rings to upset intended stoichiometry and limit molecular weight growth; and (3) the requirement to dilute the reaction as it progresses (see, for example, U.S. Pat. No. 4,302,524) to avert gelation reduces the kettle yield.

It has been found, however, that unlike the alkali metal hydroxides and their phenol salts, tetra-alkyl ammonium bases and salts are both highly ionic and dissociated in organic media like Methyl Cellosolve and thus display superior catalytic activity.

Moreover, the catalyst half-life in a typical polymerization is approximately four hours at 90° C., so by carrying the process through at least four half-lives the residual catalyst level is six percent or less of the original level and no polymer precipitation and washing is needed to remove either residual salts or low molecular weight polymer fractions arising from a stoichiometry upset or just poor catalyst activity. This circumvention of the precipitation/washing step far outweighs the somewhat longer polymerization time since the purification process itself requires even more time, extra vessels, fresh solvent for polymer redissolution, precipitation solvent, and the availability of a solvent recovery system to allow reuse of the expensive Methyl Cellosolve and precipitant.

Accordingly, the most preferred polymerization process to be employed in accordance with the present invention utilizes a fugitive catalyst, e.g., tetramethyl ammonium hydroxide, which at elevated temperatures decomposes to trimethyl amine and methanol at characteristic rates which increase with each temperature increase.

Another preferred catalyst for the phenol-epoxide interpolymerization is glycidyl trimethyl ammonium chloride when used in conjunction with an alkali metal hydroxide, e.g., potassium hydroxide. This catalyst is preferred for it not only provides one with an effective catalyst, but it can also act as an endblocker.

While, of course, the aforementioned alkaline catalysis process is preferred, other polymerization techniques well known in the polymer art can also be used.

The resulting phenoxy polymer resin upon reaction of the dihydric phenol, epoxy compound having two epoxy functional groups, branching agent, and, most preferably, endblocker in accordance with the present invention is a coatable, highly long-chain branched, non-linear phenoxy resin of random structure devoid of regularly recurring units, with the average distance between the branch sites thereof being essentially of the same order of magnitude as the average branch length. The average structure of the phenoxy polymer can thereby be expressed schematically essentially as follows:

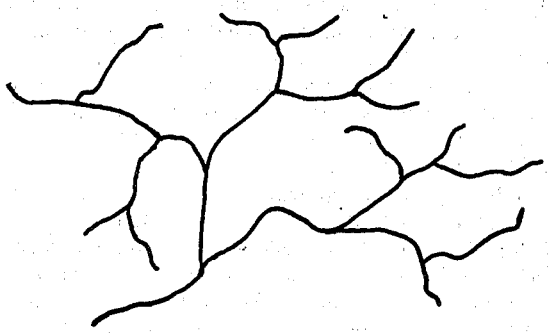

Of course, as is consistent with polymer chemistry, all polymer molecules will not be the same as difference will exist in polymer size and branch lengths, with some lengths being shorter or longer than others. Not all branches of the phenoxy resin will, therefore, be of the same order of magnitude as the average distance between branch sites. However, the overall "average" branch length of the phenoxy resin polymer is of such length as to be of the same order of magnitude as the "average" distance between branch sites in the polymer. In this sense, the foregoing structure is an "average" schematic structure. As well, due to the randomness of the branch sites and the long-chain branching, this highly branched structure of the phenoxy resin renders the polymer devoid of any regularly recurring unit. Hence, the phenoxy resins of the present invention are in no manner comparable structurally to a linear phenoxy resin, but is of the rather different highly long-chain branched structure.

Due to their different non-linear, highly branched structure, the phenoxy polymer resins of the present invention can easily be driven to a degree of polymerization affording a much higher solution viscosity than generally attainable with the corresponding linear resin obtained by simply reacting the dihydric phenol and epoxy compound. These higher viscosity solutions have appreciable elastic behavior and can be well suited for some precision coating techniques, i.e., they can have a viscosity of at least 2,500 centipoise, more preferably from 4,000 to 17,000 centipoise and most preferably from 5,000 to 12,000 centipoise at 30 weight percent solids.

While providing the advantages of a highly viscous solution, the non-linear phenoxy resins of the present invention yet also can provide the same properties exhibited by the linear phenoxy resins, if not better. Indeed, non-linear phenoxy resins of low viscosity, e.g., up to 500 centipoise at 30 weight percent solids, can provide a vesicular film exhibiting increased film speed as compared to a commercially available linear analogue, i.e., Xidex SX film.

Generally, it is believed that given sufficient gas barrier properties in a polymer matrix other properties of the polymer such as those dependent on polymer structure, e.g., average molecular weight, molecular weight dispersity and spatial geometry (linear vs. branched structure) are of little or no consequence to film performance. See, for example, U.S. Pat. No. 3,622,333. In accordance with the present invention, however, it has been discovered that contrary to such belief, the structure and molecular weight distribution of a vesicular matrix resin are apparently very important to the results achieved since those properties appear to determine the flow characteristics of the matrix during the heat development step of film processing. It is believed that without good flow characteristics, the polymer's resistance to the internal gas pressure may be enough to significantly slow bubble growth rate and thus, largely thwart attainment of the maximum bubble diameter. See, W. J. Moore, *Physical Chemistry*, 3rd Edition, Prentice-Hall Inc., page 729. The more work required to expand the molten resin, the less a bubble will grow with a given initial gas pressure. Since a high resistance to matrix flow, which results in slower bubble growth, also allows a concurrent loss of gas pressure, the net result of such a situation is poor image density and a population of thermodynamically unstable bubbles that will collapse under the thermal stressing of certain image stability tests such as 150° F. for three hours. In theory, therefore, branched polymers, i.e., as opposed to linear polymers, which have been found to exhibit more facile flow than similar linear polymers of identical molecular weights, see, for example, L. E. Nielson, *Mechanical Properties of Polymers and Composites*, Vol. 1, p. 104 (1974); F. L. McCrakin and J. Mazur, *Macromolecules*, Vol. 14, No. 5, p. 1214 (1981); and J. Roovers and P. M. Toporowski, *Macromolecules*, Vol. 14, No. 5, p. 1174 (1981), can provide improved performance in a vesicular film. Indeed, that the branched endblocked polymers of this invention can provide improved performance in a vesicular film and that they, indeed, are significantly different from linear phenoxy resins, is evident from the fact that it has been found that branched matrix resins can afford an increase in "intrinsic photospeeds" of at least 15% as compared to linear resins (when formulated with no nucleation or flow additives present so as to measure intrinsic properties only).

Aside from the use of the non-linear phenoxy resins, the present invention is consistent with prior art procedures for making a vesicular film and the details of the prior art can generally be followed in all respects simply by substituting the non-linear phenoxy resins of the present invention for the resinous vehicles of the prior art.

The vesiculating agent employed in preparing the vesicular film is sensitive to radiation, e.g., light, so that exposure to the radiation causes decomposition and formation of gas vesicles, preferably of nitrogen. Examples of suitable vesiculating agents include the following:

p-diazo-diphenylamine sulfate;
p-diazo-dimethylaniline zinc chloride;

p-diazo-diethylaniline zinc chloride;
p-diazo-ethyl-hydroxyethylaniline.one-half zinc chloride;
p-diazo-methyl hydroxyethylaniline.one-half zinc chloride;
p-diazo-2,5-diethoxy-benzoylaniline.one-half zinc chloride;
p-diazo-ethyl-benzylaniline.one-half zinc chloride;
p-diazo-dimethylaniline borofluoride;
p-diazo-2,5-dibutoxy-benzoylaniline.one-half zinc chloride;
p-diazo-1-morpholino benzene.one-half zinc chloride;
-diazo-2,5-dimethoxy-1-p-toluyl-mercapto benzene-.one-half zinc chloride;
p-diazo-3-ethoxy-diethylaniline.one half zinc chloride;
p-diazo-2,5-diisopropoxy-1-morpholino benzene sulfosalicylate;
p-diazo-2,5-diisopropoxy-1-morpholino benzene triflate;
p-diazo-2,5-diethoxy-b 1-morpholino benzene sulfosalicylate;
p-diazo-2,5-diethoxy-1-morpholino benzene triflate;
2,5,4'-triethoxy-diphenyl-4-diazonium oxalate;
p-diazo-diethylaniline.one-half chloride;
p-diazo-2,5-dibutoxy-1-morpholino-benzene chloride.zinc chloride;
p-diazo-2,5-dimethoxy-1-morpholino-benzene chloride.zinc chloride;
p-diazo-2,5-diethoxy-1-morpholino-benzene chloride.one-half zinc chloride;
2-diazo-1-naphthol-5-sulfonic acid;
p-diazo-diethylaniline borofluoride;
p-diazo-2-chloro-diethylaniline.one-half zinc chloride.

Other suitable light-sensitive, nitrogen-forming compounds are the quinone-diazides (e.g.

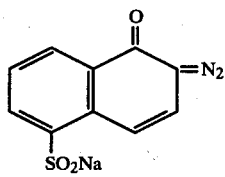

and azide compounds of the type

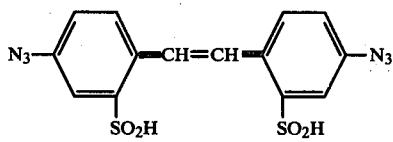

Also the carbazido (carboxylic acid azide) compounds containing a hydroxyl or amino-group in the position ortho to the carbazide group as described in U.S. Pat. No. 3,143,418 would be useful.

In addition to the vesiculating gas progenitor, it is common practice to include in the coating recipe materials frequently referred to as nucleating agents or speed enhancement additives. These additives often must be carefully selected to afford a high level of efficacy in a given matrix resin, i.e., they are not always equally applicable over a variety of matrix resins. Additives such as the silicones of U.S. Pat. No. 3,779,774 and the fluorocarbons of U.S. Pat. No. 3,779,768 perform well in the branched phenoxy vesicular film matrix resins but there are a number of other available materials that perform as well or better, e.g., fluorocarbon surfactants available from Ciba-Geigy under the designations Lodyne S-103, S-106 and S-107, and silicone surfactants available from Union Carbide under the designations L-7001, L-721, L-7000, and Y-7751.

Consistent with prior art procedures, the preferred technique for preparing a vesicular film is to first formulate the resin vehicle and the materials to be disposed therein, such as the vesiculating agent, in a suitable solvent. A range of solvent systems can be used for the present phenoxy resins. The most preferred solvent is Methyl Cellosolve. Other solvents suitable as diluents for present purposes are acetone, methyl ethyl ketone, tetrahydrofuran, dioxane, 2-ethyoxyethyl acetate, chlorinated solvents such as ethylene dichloride, toluene, and blends of such solvents.

If a diazo compound is used, as is preferred, it is generally dissolved in a small quantity of a polar solvent such as methanol, aqueous methanol, acetonitrile or acetone, and then added dropwise to the stirred phenoxy resin solution to minimize precipitation of either the salt or the polymer. The preferred amount of the diazo compound is about 4 to 10 percent by weight of the phenoxy resin used.

When a diazo compound is used as the vesiculating agent, it is preferred, but not necessary, that the solvent in which the diazo compound is dissolved be compatible with the solvent system selected for the phenoxy resin in order to minimize the possibility of the diazo compound or the phenoxy resin precipitating out when the two solutions are mixed. It is understood in the art that a uniform dispersion of the vesiculating agent in the vehicle is desired.

In making a usable vesicular film, the resin vehicle containing the vesiculating agent and other ingredients which may be included is coated on a suitable support. The various materials known in the art for this purpose are contemplated. The most common materials are the polyester films known by the trademarks MYLAR ®, ESTAR ®, CELANAR ®, LUMIRROR ®, HOSTAPHAN ®, etc.

In addition to the foregoing ingredients, other additives and treatments known in the art may be used as desired for the beneficial effects provided by them. For example, the hot fluid treatment described in U.S. Pat. No. 3,149,971 can be used in making a vesicular film in accordance with the present invention if desired.

The following examples are given as specific illustrations of the claimed invention. It should be understood, however, that the specific details set forth in the examples are merely illustrative and in nowise limitative.

In the examples, the photospeed of the vesicular films prepared from phenoxy resins of the present invention was determined. The general procedure for the determination was as follows:

1. Using an AM Bruning OP-57 vesicular film processor, exposure and development conditions that afford a maximum density at least 1.8 above Dmin. were empirically determined.
2. A control vesicular film sample, e.g., Xidex SX film, and the experiment's sample were processed under identical conditions by contact duplication from a 21 step silver step tablet.
3. The visual transmission density of each step of the silver master and the visual projection density of the control and sample film were then read.

4. Using Cartesian coordinates, the density of each step of the silver master was plotted on the abscissa and the densities of each corresponding step of both the control and sample were plotted on the ordinate. Smooth curves were drawn through each set of points.
5. On the control and sample film curves, the points 1.8 density units above Dmin. were located. If Dmin. was identical on both curves, the units between the two points were measured.
6. If the sample film curve was to the left of the control film curve, the antilog of the number determined in step 5 was taken and multiplied by one hundred to obtain the photospeed of the sample versus the control film.
7. If the sample film curve was to the right of the control film curve, the antilog of the number determined in step 5 was taken and then its reciprocal multiplied by one hundred to obtain the relative photospeed.
8. If the control and sample curves in step 4 had different Dmin. values, the sample curve point located in step 5 was projected parallel to the ordinate axis until it was opposite the point located on the control curve in step 5.
9. Using the translated point from step 8, the units between the control and sample speedpoints were measured, with the samples relative photospeed being determined via step 6 or 7.

In systems where Mmax. of 1.8 above Dmin. was not achieved, the speed point was defined as 1.0 D.U. above Dmin. and steps 5 through 9 were then employed.

In order to realistically determine the performance of various branched endblocked phenoxy resin film recipes, the reference standard was chosen as the currently most widely used commercial vesicular film, Xidex SX. Since there may be some lot-to-lot variation expected in any film product, a dozen randomly purchased rolls were evaluated on the AM Bruning OP-57 developer and an average or mean speed value was established as the reference point. Thus, with the single exception of measuring intrinsic speed values, which were obtained versus a laboratory synthesized linear phenoxy resin sample (so that no nucleation etc. additives would be present as in commercial samples), all quoted photospeeds in the following examples have been normalized to the determined mean SX photospeed.

EXAMPLE 1

A five liter resin flask was charged with 501.3 g (3.95 eq) of Heloxy WC-69 diglycidyl ether of resorcinol (available from Wilmington Chemical Co.), 121.17 g (1.22 eq) of triglycidyl p-aminophenol, 314.8 g (2.52 eq) of 4,4-sulfonyl diphenol, 138.48 g (2.52 eq) of resorcinol and 28.84 g (0.192 eq) of p-tertiary butyl phenol, and then dissolved into 2430 ml of Methyl Cellosolve solvent. The solution was heated to 90° C. under a nitrogen atmosphere and then catalyzed with 64.8 g of 20 wt. percent methanol solution of tetramethyl ammonium hydroxide diluted with 120 ml of Methyl Cellosolve. After stirring 20 hours at 90° C., the reaction was cooled to 25° C. and any residual alkalinity neutralized via addition of 7.5 g of 36.5% aq. hydrochloric acid diluted in 120 ml of Methyl Cellosolve.

The final 30 wt. percent solution was found to have a Brookfield viscosity of 7,457 cp at 70° F. which makes it very useful for those precision coating techniques requiring viscosities much higher than those normally used for roll coating application.

The efficacy of the resin as a vesicular film matrix was established on a laboratory scale via preparation of a coating lacquer and Meyer rod application to a film support as described below.

A solution of 2.58 grams of 2,5-diisopropoxy-4-morpholino benzene diazonium sulfosalicylate in 11.86 grams of methanol was prepared by stirring with a magnetic mixer for three to five minutes. Meanwhile a second solution was prepared by adding, for example, 0.09 g. of a silicone surfactant, i.e., Union Carbide L-7001, (as a nucleating and flow additive) to 100 grams of a 30 weight percent solids solution of the matrix resin in Methyl Cellosolve. Next, the methanolic diazonium salt solution was slowly added to the stirred resin solution and the stirring continued for fifteen minutes to insure complete dissolution. After passing the resulting lacquer through a Millipore prefilter any resulting air bubbles were allowed to escape and then the solution was hand coated onto a prebondcoated polyester base (usually 5 mils) using a number sixteen Meyer rod to afford a circa 0.2 mil dry thickness. The coated base was allowed a one minute air dry at ambient temperature before being transferred to a forced draft drying oven at 250° F. for one minute.

The photospeed of the prepared vesicular film was then measured in accordance with the aforediscussed general procedure, and was determined to be 129%.

EXAMPLE 2

91.76 g (0.74 epoxy equivalents) of resorcinol diglycidyl ether; 27.00 g (0.12 epoxy equivalents) of a tetrafunctional glycidyl ether available from Shell Oil Co. under the designation EPON 1031; 52.51 g (0.417 hydroxy equivalents) of sulfonyl diphenol; 22.02 g (0.400 hydroxy equivalents) of resorcinol; and 9.01 g (0.06 hydroxy equivalents) of 4-t-butyl phenol were charged to a reaction vessel with 488 ml. of Methyl Cellosolve as solvent and 7.2 g of 20 wt percent solution of Me$_4$NOH in methanol as catalyst. The resulting solution contained 30 percent by weight solids.

The reaction was conducted under nitrogen for 7 hours at 118° C. with no gelation of the polymer occurring. The catalyst was neutralized by adding 1 g of 36.5 percent HCl. The Brookfield viscosity of the final solution was determined to be about 1230 cp at room temperature, i.e., 70° F.

The photospeed of a vesicular film prepared from the recovered polymer via the procedure of Example 1 was then measured in the aforediscussed manner in relation to the widely used commercial film, Xidex SX, which is based on a linear phenoxy resin. The photospeed was determined to be 109% by the aforediscussed general procedure.

EXAMPLE 3

A five liter flask was charged with 501.31 g. of resorcinol diglycidyl ether (Heloxy WC-69), 121.17 g. of triglycidyl p-aminophenol (Ciba-Geigy 0510), 311.79 g. of 4,4'-sulfonyl diphenol, 137.16 g. of resorcinol, and 47.7 g. of 2,4,6-trichlorophenol dissolved in 2462 ml. of Methyl Cellosolve. The stirred solution was heated to 90° C. under a nitrogen atmosphere and catalyzed with 64.8 g. of 20% by weight solution of tetramethylammonium hydroxide dissolved in 120 ml. of Methyl Cellosolve. After 20 hours at 90° C., the reaction was cooled to room temperature and the residual catalyst neutralized with 7.5 g. of 36.5% aqueous hydrochloric acid dissolved in 120 ml. of Methyl Cellosolve. The Brookfield viscosity of this 30% weight percent solids solution was 5300 cp at 22° C.

EXAMPLE 4

A five liter reaction flask was charged with 501.31 g. of Heloxy WC-69 resorcinol diglycidyl ether, 121.17 g. of triglycidyl p-aminophenol (Ciba-Geigy product 0510), 501.04 g. of 4,4'-sulfonyldiphenol, 73.61 g. of resorcinol, and 18.74 g. of phenyl glycidyl ether, which were then dissolved in 2700 ml. of Methyl Cellosolve. The stirred solution was heated to 110° C. under a nitrogen atmosphere and catalyzed with 64.8 g. of 20 wt. percent methanolic solution of tetramethylammonium hydroxide dissolved in 120 ml. of Methyl Cellosolve.

After 20 hours at 110° C. the reaction was cooled to room temperature and neutralized with 7.5 g. of 36.5 wt. percent aqueous hydrochloric acid dissolved in 120 ml. of Methyl Cellosolve.

EXAMPLE 5

A one liter reaction flask was charged with 79.3 g. of Heloxy WC-69 resorcinol diglycidyl ether, 42.8 g. of Novolac glycidyl ether (DEN-438 available from Dow Chemical Co.), 105.47 g. of 4,4'-sulfonyl diphenol, and 9.48 g. of 2,4,6-trichlorophenol. These reactants were then dissolved in 534 ml. of Methyl Cellosolve. The reaction solution was heated to 118°-120° C. under nitrogen, catalyzed with 7.2 g. of a 20 wt. percent methanolic solution of tetramethylammonium hydroxide (diluted with 20 ml. of Methyl Cellosolve prior to addition) and held at said temperature for 7.5 hrs. After cooling to room temperature, the resin solution was neutralized with 1.0 g. of 36.5 wt. percent aqueous hydrochloric acid dissolved in 20 ml. of Methyl Cellosolve. The 30 weight percent solids solution had a Brookfield viscosity of 596 cp at 70° F. at this 12 mole percent endblocker level.

EXAMPLE 6

A three neck one liter reaction flask was charged with 26.99 g. (0.151 eq.) of Dow Chemical epoxidized novolac DEN-438, 124.57 g. (0.716 eq.) of Dow DER-332 epoxidized bisphenol A, 50.06 g. (0.400 eq.) of sulfonyl diphenol, 22.02 g. (0.400 eq.) of resorcinol, and 10.09 g. (0.067 eq.) of 4-t-butylphenol and dissolved in 565 ml. of Methyl Cellosolve. The polymerization was run 3.5 hrs. at 120° C. using 7.2 g. of a 20% methanolic solution of tetramethyl ammonium hydroxide as catalyst and upon cooling afforded a 1,208 cp Brookfield viscosity at room temperature.

EXAMPLE 7

A one liter reaction flask was charged with 83.55 g. of resorcinol diglycidyl ether, 20.20 g. of triglycidyl p-aminophenol, 2.90 g. of glycidyl methacrylate, 12.25 g. of resorcinol and 83.58 g. of 4,4'-sulfonyldiphenol. The reactants were then dissolved in 470 ml. Methyl Cellosolve and the resulting solution was heated to 90° C. under nitrogen and catalyzed with 7.2 g. of a 20 weight percent methanolic solution of tetramethylammonium hydroxide (diluted with 10 ml. of Methyl Cellosolve). After 20 hours at 90° C., the reaction mixture was cooled to room temperature and the catalyst was then neutralized with 36.5 weight percent aqueous hydrochloric acid dissolved in 10 ml. of Methyl Cellosolve. The 30 weight percent solids solution had a Brookfield viscosity of 2,125 cp at 69° F.

EXAMPLE 8

A one liter flask was charged with 83.55 g. of resorcinol diglycidyl ether, 20.20 g. of triglycidyl p-aminophenol, 3.37 g. of glycidyl trimethylammonium chloride, and 111.44 g. of 4,4'-sulfonyldiphenol dissolved in 518 ml. of Methyl Cellosolve. The stirred solution was heated to 114° C. under a nitrogen atmosphere and catalyzed with 1.06 g. of potassium hydroxide. After 20 hours at 114° C., the reaction was cooled to room temperature and the residual catalyst was neutralized with 36.5% aqueous hydrochloric acid dissolved in 10 ml. of Methyl Cellosolve. The Brookfield viscosity of this 30 weight percent solution was 20,500 cp at 69° F.

EXAMPLE 9

Following generally the procedure of Example 1 various phenoxy resins in accordance with the present invention were prepared, with approximately stoichiometric quantities of all phenolic ingredients vs. all epoxide ingredients having been employed. The efficacy of the resin as a vesicular film matrix was measured on a laboratory scale via preparation of a coating lacquer and application to a film support also following generally the procedure of Example 1. The photospeed of the prepared vesicular film was then measured in accordance with the generally described procedure. The results are tabulated in the following Table I, with the relative amounts of dihydric phenol, diepoxide, branching agent and endblocker also being given.

TABLE I

| RUN | Difunctional Epoxide (mole %)* | Difunctional Phenol (mole %)* | Branching Agent (mole %)* | Endblocker (mole %)* | Viscosity at 30% solids (cp) | Reaction temp/time | Additives | Film Speed vs. SX | Resol. DIA target[a] |
|---|---|---|---|---|---|---|---|---|---|
| A (Example 1) | resorcinol diglycidyl ether (83) | 4,4'-sulfonyl-diphenol (46) + resorcinol (46) | distilled** triglycidyl p-amino-phenol (17) | p-t-butyl phenol (8) | 7,457 | 90° C./ 20 hrs. | silicone surfactant (Union Carbide L-7001) | 129% | — |
| B (Example 3) | resorcinol diglycidyl ether (83) | 4,4'-sulfonyl-diphenol (45) + resorcinol (45) | distilled triglycidyl p-amino-phenol (17) | 2,4,6-tri-chlorophenol (10) | 5300 | 90° C./ 20 hrs. | — | 121% | 252 lp/mm |
| C | resorcinol diglycidyl ether (83) | 4,4'-sulfonyl-diphenol (48) + resorcinol (48) | triglycidyl*** p-amino-phenol (17) | p-t-butyl phenol (4) | 6,013 | 120° C./ 10 Hrs. | fluoro-carbon surfactant (Ciba Geigy S-107) | 117% | 252 lp/mm |
| D | resorcinol diglycidyl ether (83) | 4,4'-sulfonyl-diphenol (48) + | triglycidyl p-amino-phenol (17) | p-t-butyl phenol (4) | 6,013 | 120°0 C./ 10 hrs. | silicone surfactant (Union | 112% | 283 lp/mm |

TABLE I-continued

| RUN | Difunctional Epoxide (mole %)* | Difunctional Phenol (mole %)* | Branching Agent (mole %)* | Endblocker (mole %)* | Viscosity at 30% solids (cp) | Reaction temp/time | Additives | Film Speed vs. SX | Resol. DIA target[a] |
|---|---|---|---|---|---|---|---|---|---|
|   |   | resorcinol (48) |   |   |   |   | Carbide L-7001 |   |   |
| E | resorcinol diglycidyl ether (78) | 4,4'-sulfonyl-diphenol (65) + resorcinol (35) | distilled triglycidyl p-amino-phenol (17) | phenyl glycidyl ether (5) | 5,490 | 90° C./ 20 hrs. | silicone surfactant (Union Carbide L-7001) | 120% | 252 lp/mm |
| F | resorcinol diglycidyl ether (80) | 4,4'-sulfonyldi-phenol (94) | DOW DEN-438 epoxidized Novoloc (20) | p-t-butyl phenol (6) | 1,532 | 118° C./ 7.5 hrs. | fluoro-carbon surfactant (S-107) | 107% | — |
| G | resorcinol diglycidyl ether (80) | 4,4'-sulfonyldi-phenol (94) | DOW DEN-438 epoxidized Novoloc (20) | 2,4,6-tri-chlorophenol (6) | 1,532 | 118° C./ 7.5 hrs. | fluoro-carbon surfactant (S-103) | 104% | — |
| H | resorcinol diglycidyl ether (83) | 4,4'-sulfonyldi-phenol (96) | triglycidyl p-amino-phenol (17) | p-t-butyl phenol (4) | 1,175 | 120° C./ 10 hrs. | fluoro-carbon surfactant (S-107) | 123% | 200 lp/mm |
| I | resorcinol diglycidyl ether (83) | 4,4'-sulfonyldi-phenol (96) | triglycidyl p-amino-phenol (17) | p-t-butyl phenol (4) | 1,175 | 120° C./ 10 hrs. | silicone surfactant (L-7001) | 126% | 283 lp/mm |
| J | resorcinol diglycidyl ether (100) | 4,4'-sulfonyldi-phenol (78) | phloro-glucinol (15) | 2,4,6-tri-chlorophenol (7) | 226 | 119° C./ 10 hrs. | fluoro-carbon surfactant (S-103) | 113% | — |
| K | resorcinol diglycidyl ether (85) | 4,4'-sulfonyldi-phenol (90) | triglycidyl ether (15) | 4-chloro-phenol (10) | 495 | 117° C./ 7.5 hrs. | fluoro-carbon surfactant (S-107) | 125% | — |
| L | resorcinol diglycidyl ether (90) | 4,4'-sulfonyldi-phenol (95) | triglycidyl isocyanurate (10) | 2,4,6-tri-chlorophenol (5) | 135 | 117° C./ 10 hrs. | fluoro-carbon surfactant (S-103) | 120% | — |

*mole percent of respective epoxy or phenolic components in phenoxy resin
**Ciba Geigy - 0510
***Ciba Geigy - 0500
[a] Under comparable test conditions; commercial SX film ranges from 250–320 lp/mm

EXAMPLE 10

The "intrinsic" photospeeds of linear and branched resin analogues using identical film recipes containing no added nucleation aid and subjected to identical processing were measured. In this fashion, the deciding factor governing the magnitude of the photospeed has to be the suitability of the resin structure for the application. This was done to demonstrate the difference and superiority of the endblocked branched resin structures prepared in accordance with the subject invention.

Both a branched and a completely linear analogue were made using the same polymerization conditions in each case. The linear polymer was prepared using stoichiometrically equivalent amounts of 4,4'-dihydroxydiphenyl sulfone and the diglycidyl ether of resorcinol and by conducting the polymerization reaction at 115°–119° C. at 30 percent concentration in Methyl Cellosolve solution with tetramethylammonium hydroxide as the catalyst. The reaction was run for periods of time equal to or greater than (i.e., 7–10 hours) the branched resin synthesis to afford a validly representative sample.

The branched endblocked resin was obtained by copolymerizing 80 mole percent of the diglycidyl ether of resorcinol (RDGE) with the equivalent of twenty mole percent of a trifunctional branch unit as an epoxidized Novolac (Dow Chemicals DEN-438). The difunctional phenol was 4,4'-dihydroxydiphenyl sulfone (SDP) used in an amount exactly equivalent to the total number of epoxide groups, thus gelation would have been unavoidable except for the addition of 15 mole percent of 2,4,6-trichlorophenol included as an endblocker.

The "intrinsic" photospeeds were obtained using only 6 wt. percent diazo loading in the film and processing a Kodak step-tablet on a commercial AM Bruning OP-57 processor. The results are tabulated in the following table.

TABLE II

| Resin Type | SDP[a] | Resorc.[a] | RDGE[b] | Mole % Branching[b] | End-blocker | Photospeed vs. Linear Resin |
|---|---|---|---|---|---|---|
| Linear | 100 | 0 | 100 | 0 | 0 | 100 |
| Endblocked Branched | 100 | 0 | 80 | 20[c] | 15[d] | 116 |
| Linear | 100 | 0 | 100 | 0 | 0 | 100 |
| Endblocked | 50 | 50 | 83 | 17[e] | 8[f] | 115 |

TABLE II-continued

| Resin Type | SDP[a] | Resorc.[a] | RDGE[b] | Mole % Branching[b] | Endblocker | Photospeed vs. Linear Resin |
|---|---|---|---|---|---|---|
| Branched | | | | | | |

[a] defined as mole percent of actual amount of difunctional of specific genus
[b] defined as mole percent of difunctional of same chemical genus
[c] DEN-438 Novolac Epoxide
[d] 2,4,6-trichlorophenol
[e] triglycidyl p-aminophenol
[f] p-tert-butyl phenol The margin of enhanced intrinsic photospeed exhibited by the branched resins of the present invention is useful and significant in commercial practice and is directly reflected in the fact that resins of this invention can exceed the photospeed of commercial linear phenoxy vesicular films, e.g., Xidex SX brand, by as much as 29% when properly formulated with appropriate nucleating additives.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. In a vesicular film element comprising a film support and a coating therefor including a matrix resin and an imaging amount of a photosensitive vesiculating agent adapted to generate gas vescicles upon exposure to radiation and subsequent heat-actuated development, the improvement which comprises, as the matrix resin for the photosensitive vesiculating agent, a coatable, highly branched, ungelled, monofunctional comonomer endblocked, non-linear phenoxy resin of random structure devoid of regularly recurring units, with the average distance between the branch sites thereof being essentially of the same order of magnitude as the average branch length.

2. The vesicular film element as defined by claim 1, said matrix resin comprising the copolymerization product of (i) at least one dihydric phenol, (ii) an epoxy comonomer having two epoxy functional groups, (iii) an epoxy or phenolic branching agent having a functionality greater than 2, and (iv) a monofunctional epoxy or phenolic endblocking compound.

3. The vesicular film element as defined by claim 2, the amount of branching agent (iii) being such as to provide at least 10 mole percent of branch sites in the phenoxy resin.

4. The vesicular film element as defined by claim 2 or 3, wherein the branching agent (iii) possesses a functionality of about 3.

5. The vesicular film element as defined by claim 2 or 3, wherein the branching agent comprises an epoxy compound.

6. The vesicular film element as defined by claim 5, wherein the branching agent comprises triglycidyl p-aminophenol.

7. The vesicular film element as defined by claim 2, wherein the dihydric phenol comprises a sulfone.

8. The vesicular film element as defined by claim 7, wherein the dihydric phenol comprises at least about 50 molar percent of sulfonyl diphenol.

9. The vesicular film element as defined by claim 8, wherein the dihydric phenol further comprises resorcinol.

10. The vesicular film element as defined by claim 2, wherein the dihydric phenol comprises resorcinol.

11. The vesicular film element as defined by claim 2, wherein the molar ratio of dihydric phenol (i) to diepoxide (ii) is in the range of from about 0.4 to 2.4.

12. The vesicular film element as defined by claim 2, wherein the endblocker (iv) comprises a glycidyl ether.

13. The vesicular film element as defined by claim 2, wherein the endblocker (iv) comprises a phenol whose pka is within about one unit of at least one dihydric phenol (i).

14. The vesicular film element as defined by claim 2, wherein the endblocker comprises a mixture of a monofunctional epoxide and monofunctional phenol.

15. The vesicular film element as defined by claim 2, wherein the coating of said element comprises a nucleating additive.

16. The vesicular film element as defined by claim 15, wherein the nucleating additive is a fluorocarbon or silicone surfactant.

17. In a vesicular film element comprising a film support and a coating therefor including a matrix resin and an imaging amount of a photosensitive vesiculating agent adapted to generate gas vesicles upon exposure to radiation and subsequent heat-activated development, the improvement which comprises, as the matrix resin for the photosensitive vesiculating agent, a coatable, ungelled, non-linear phenoxy resin of random structure being highly long-chain branched with a monomeric tri- or tetrafunctional compound, said branched phenoxy resin being devoid of regularly recurring units and having the average distance between the branch sites of essentially the same order of magnitude as the average branch length.

18. The film element of claim 17, wherein the monomeric branching compound comprises a trifunctional compound.

19. The film element of claim 17 or 18, wherein the monomeric branching compound comprises triglycidyl p-aminophenol.

20. A vesicular image forming element comprising
   a support, and
   a vehicle coated thereon containing a an imaging amount dispersed sensitizer capable of generating gas vesicles upon exposure to radiation, said vehicle comprising a film-forming, thermoplastic long-chain branched phenoxy polymer having a gas diffusivity which permits internal formation of record-defining bubbles of gas liberated by said sensitizer during heat-actuated development of the element subsequent to exposure to radiation, wherein the phenoxy resin comprises the non-linear, ungelled reaction product of
   (i) at least one dihydric phenol,
   (ii) an epoxy compound having two epoxy functional groups, (iii) an epoxy or phenolic branching agent having a functionality greater than 2,
wherein the amount of branching agent employed is sufficient to provide at least 10 mole percent branch sites in the polymer resin, and
(iv) a monofunctional phenol or epoxy endblocker compound.

21. The vesicular element of claim 20, wherein the branching agent possesses a functionality of about 3.

22. The vesicular element of claim 20 or 21, wherein the branching agent comprises an epoxy compound.

23. The vesicular element of claim 20, wherein the epoxy (ii) comprises an aromatic diglycidyl ether.

24. The vesicular element of claim 20, wherein the epoxy (ii) comprises resorcinol diglycidyl ether.

25. The vesicular image forming element of claim 20, wherein the sensitizer is a diazo compound.

26. The vesicular element of claim 20, wherein the dihydric phenol (i) comprises sulfonyl diphenol.

27. The vesicular element of claim 26, wherein the dihydric phenol further comprises resorcinol.

28. The vesicular element of claim 20, wherein the endblocker comprises a mixture of an epoxide and phenol.

29. The vesicular film of claim 20, wherein the coated vehicle on the support further comprises a nucleating additive.

30. The vesicular film of claim 29, wherein the nucleating additive is a fluorocarbon or silicone surfactant.

31. A composition of matter comprising a phenoxy matrix resin and an imaging amount of a photosensitive vesiculating agent adapted to generate gas vesicles upon exposure to radiation and subsequent heat-actuated development, wherein the phenoxy resin comprises the non-linear, ungelled, highly long-chain branched reaction product of
(i) at least one dihydric phenol,
(ii) an epoxy compound having two epoxy groups,
(iii) an epoxy or phenolic branching agent having a functionality greater than 2,
wherein the amount of branching agent employed is sufficient to provide at least 10 mole percent branch sites in the polymer resin, and
(iv) a monofunctional phenol or epoxide as an endblocker compound.

32. The composition of matter of claim 31, wherein the composition further comprises a nucleating agent.

33. The composition of matter of claim 31, wherein the composition further comprises a fluorocarbon or silicone surfactant as a nucleating agent.

* * * * *